May 14, 1963  L. C. A. M. BIGNON  3,089,174
WINDSHIELD WIPER BLADES
Filed Feb. 11, 1960  3 Sheets-Sheet 2
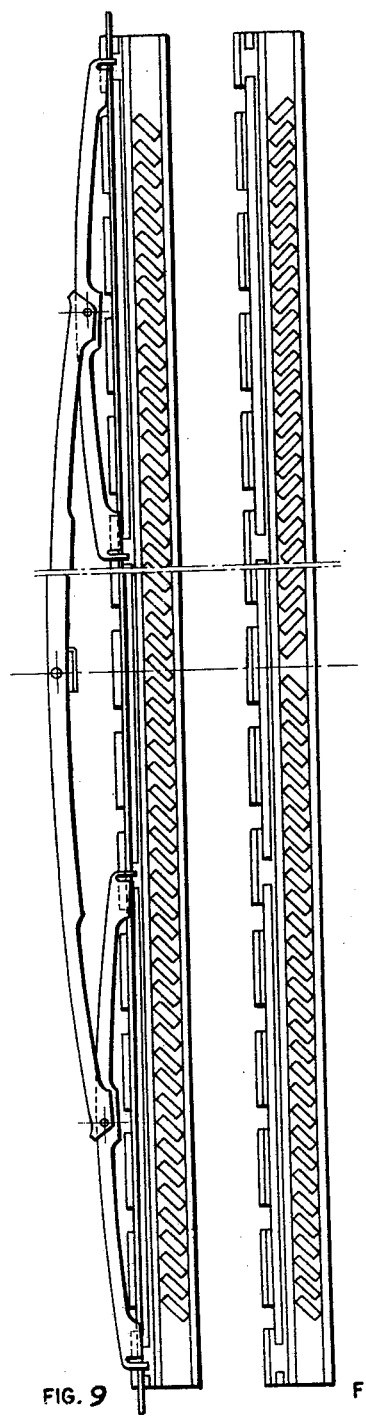
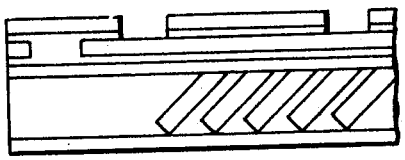
FIG. 12
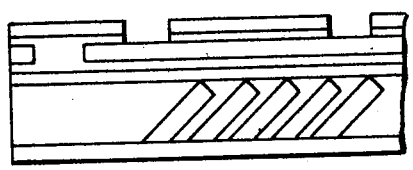
FIG. 13
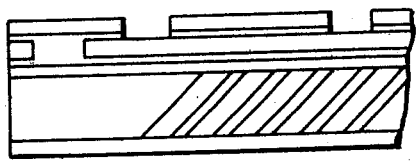
FIG. 14
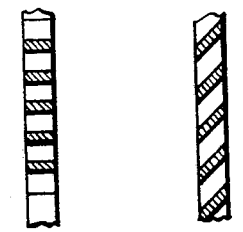
FIG. 11a  FIG. 11b
FIG. 9  FIG. 10

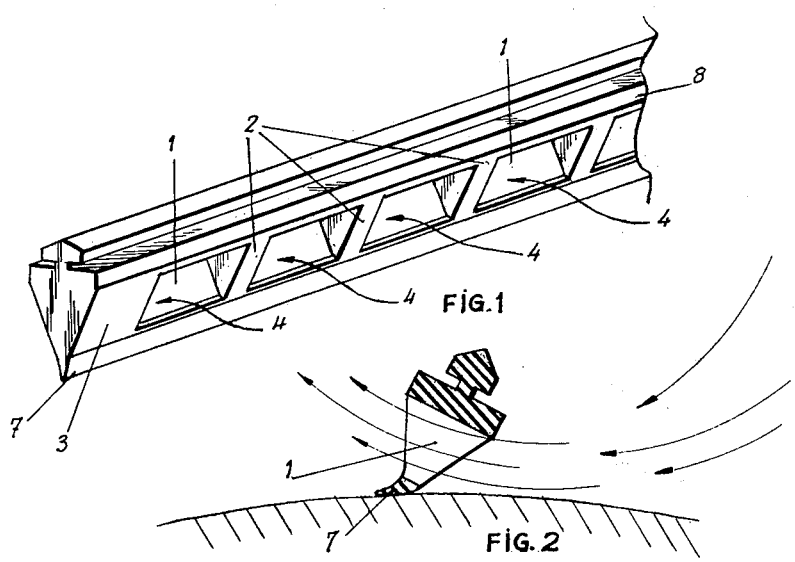
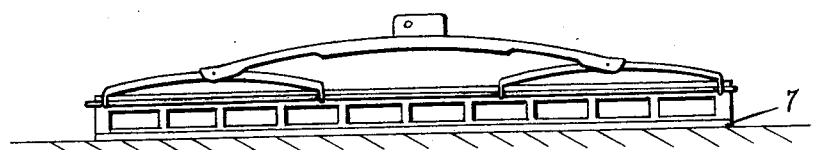
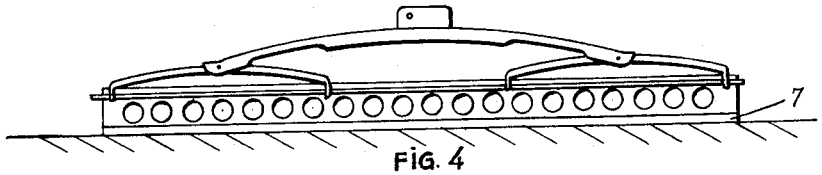
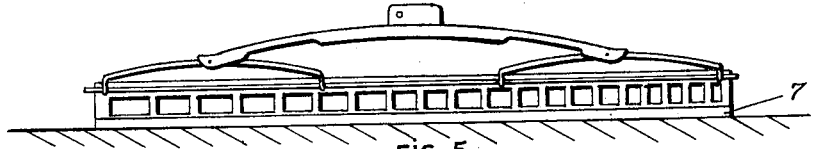
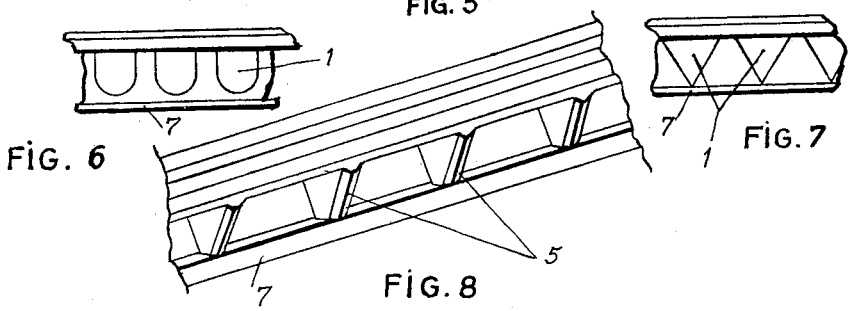

May 14, 1963    L. C. A. M. BIGNON    3,089,174
WINDSHIELD WIPER BLADES
Filed Feb. 11, 1960    3 Sheets-Sheet 3

United States Patent Office 3,089,174
Patented May 14, 1963

3,089,174
WINDSHIELD WIPER BLADES
Lucien Charles Alexis Marie Bignon,
26 Rue Guynemer, Seine, Issy, France
Filed Feb. 11, 1960, Ser. No. 8,012
Claims priority, application France Feb. 13, 1959
9 Claims. (Cl. 15—250.36)

This invention relates in general to windshield wipers and more particularly to an improved blade therefor.

It is well known that, due to the air pressure applied against the windshield surface of a running vehicle, the windshield wiper blades tend to move away from the glass surface.

This drawback increases with speed and consequently reduces or may even overcome the action of the spring means urging the wiper blade against the glass surface, as the air pressure may attain values sufficient to keep the windshield wiper blade out of contact with the glass surface.

To avoid this major drawback, the improved windshield wiper blade of this invention is formed with apertures or orifices extending throughout its thickness, which are separated from one another by connecting flanges.

The purpose of these apertures is to permit the passage of air therethrough, so that the air streams may flow more or less freely through the entire wiper blade.

Under these conditions, the air pressure will strike only the surfaces of these connecting flanges, of which the edges, in addition, may be shaped or streamlined in order to reduce the resistance offered thereby to the air flow.

The length of these apertures may be regular or gradually decreasing, and the ratio of the lengths of these apertures to the lengths of the flanges may also vary.

According to a typical form of embodiment, these apertures are inclined instead of being perpendicular to the longitudinal axis or greater dimension of the wiper blade, the latter being utilized against the glass surface in one or the other direction of its inclination.

The inclination of the aforesaid apertures may be constant or regularly variable.

The flanges separating the apertures from one another may also be oblique instead of being parallel to the normal section of the wiper blade.

According to another form of embodiment, the windshield wiper blade is provided with additional notch-forming apertures or recesses disposed at spaced intervals along its length and extending through and through the thickness of the blade.

These apertures are formed through the upper portion of the rubber blade to constitute additional passages facilitating the passage of the air stream striking the blade surface, and they consist of intervals provided between the lugs or like portions retaining the wiper blade on the elastic body of the blade holder, the notches formed between these lugs or like elements extending under the elastic body of the blade holder.

The present invention will be better understood from the following description if reference is made to the attached drawings showing diagrammatically by way of example a few typical forms of embodiment of the invention. In the drawings:

FIGURE 1 is a perspective view showing the windshield wiper blade, formed with its air-flow apertures and the connecting flanges thereof;

FIGURE 2 is a cross-section taken across an aperture;

FIGURE 3 is a front view of a complete windshield wiper equipped with a wiper blade formed with rectangular apertures;

FIGURE 4 is a view corresponding to FIG. 3 but wherein the apertures are substantially circular;

FIGURE 5 is another front view showing a windshield wiper blade in which apertures of gradually decreasing cross-sectional area are formed;

FIGURE 6 shows one fragment of a wiper blade having apertures with rounded edges formed therein;

FIGURE 7 shows one fragment of a wiper blade having triangular apertures formed therein;

FIGURE 8 is a perspective fragmentary view of a wiper blade wherein the flanges have streamlined edges;

FIGURE 9 shows in front elevation another form of embodiment of a wiper blade having apertures of uniform inclination formed therein;

FIGURE 10 shows a separate wiper blade having apertures formed therein that are inclined in one direction along a first longitudinal portion and in the other direction in the remaining portion;

Figure 16:
Figure 15:
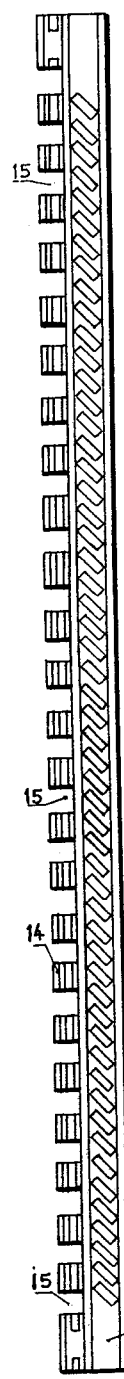

FIGURES 11a and 11b respectively, are a cross section showing a blade formed with apertures perpendicular to the longitudinal axis of the blade and a blade formed with apertures forming an angle to this longitudinal dimension;

FIGURES 12, 13 and 14 illustrate diagrammatically, by way of example, apertures having the shape of truncated rectangles and of parallelograms, respectively;

FIGURE 15 shows an improved wiper blade formed with additional notches;

FIGURE 16 shows the elastic holder of the blade shown in FIGURE 15, and

Figure 17:
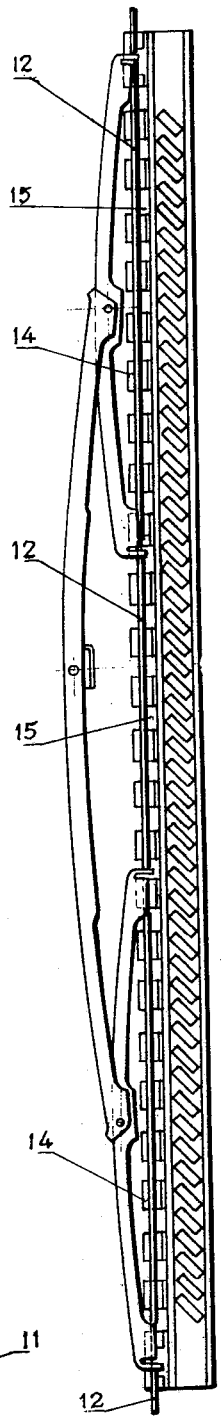

FIGURE 17 shows a wiper blade carried by its elastic holder and mounted on the wiper bridges.

The windshield wiper blade according to this invention, as shown in perspective view in FIGURE 1, is formed throughout its length or only along one portion of its length with apertures or windows 1 extending through and through its thickness.

Flanges 2 separate these apertures from one another and connect together with the head 3 the wiping lip 7 proper to the upper portion 8 of the blade.

The object of this invention will be readily understood from the drawings, for it consists in allowing the air stream produced by the operation of the vehicle (which normally tends to move the blade away from the windshield surface in the case of conventional wipers) to flow more or less freely through the apertures 1, so that the air pressure applied to the blade is reduced considerably and will not tend to raise the blade off the glass surface.

The flow of air thus produced through these apertures is clearly visible in the cross-sectional view of FIGURE 2 which is taken across one of the apertures.

These apertures 1 may have a rectangular, round, square, triangular or other configuration, as shown in FIGURES 3, 4, 6 and 7 by way of example.

If triangular-shaped apertures are used, the vertex of each triangle should preferably be adjacent to the wiping lip of the blade in order better to distribute the pressure exerted by the blade holder on the lip.

According to the distribution of the air pressure on the windshield, which depends on many factors, it may be advantageous that the apertures 1 differ in cross-sectional area throughout the blade length.

Thus, FIG. 5 illustrates a blade of this type wherein the sections of the apertures 1 are of gradually increasing length from one end to the other end of the blade.

These apertures may also have rounded lower edges (FIG. 6) or a triangular shape (FIGURE 7); the flanges between adjacent apertures may have a contour decreasing in thickness towards their ends, somewhat like airfoils (FIG. 8).

As already stated, these apertures 1 may be inclined with respect to the longitudinal axis of the blade; various forms of embodiment having this characteristic are shown in FIGURES 9 to 14 of the drawings. The apertures 1 may be parallel to one another (FIGURE 9) or inclined in one direction along one portion of the blade length and in the other direction along the remaining portion (FIGURE 10), and the flanges themselves separating these apertures may extend, in cross-section, perpendicularly or obliquely with respect to the longitudinal axis of the blade (FIGS. 11a and 11b).

Moreover, these apertures may have the shape of truncated rectangles (FIGURES 12 and 13), or the shape of parallelograms (FIGURE 14).

Finally, the blade may comprise, in addition to these apertures, other apertures formed in its upper portion and consisting of the notches left between the lugs provided for anchoring the blade to the resilient holder or arm.

As a matter of fact, the rubber blade is in most cases supported by a wiper holder 12 of resilient metal (FIGS. 15 and 16).

Through the apertures 13 formed in this resilient holder the anchoring lugs 14 formed with enlarged head portions are fitted for securing the rubber blade on the holder.

These lugs are spaced from one another by gaps or notches 15 constituting air passages extending either perpendicularly or obliquely with respect to the longitudinal axis of the blade.

It is clear that these notches extend beneath the resilient holder, and their relative spacing may be regular or irregular along the blade, so as to constitute additional air passages for the purpose specified.

I claim:

1. In a windshield wiper blade having a head portion adapted to be supported by a holder and a wiping lip, the improvement comprising the provision of apertures extending at spaced intervals along the length and throughout the thickness of the blade in order to permit the passage of the stream of air current striking the windshield so as to prevent the pressure produced thereby from moving the windshield wiper blade away from the glass surface, said apertures defining spaced flanges which connect the head portion with the wiping lip and the apertures occupying a surface at least equal to half the surface of the wiper blade between the wiping lip and the head portion thereof.

2. Windshield wiper blade as set forth in claim 1, wherein said apertures are inclined with respect to the longitudinal axis of the blade, and have a triangular, cross-sectional shape.

3. Windshield wiper blade as set forth in claim 2, wherein the angle of inclination of the apertures is constant.

4. Windshield wiper blade as set forth in claim 2, wherein the angle of inclination of the apertures varies regularly.

5. Windshield wiper blade as set forth in claim 2, wherein the flanges separating the apertures from one another extend perpendicularly with respect to the longitudinal axis of the blade.

6. Windshield wiper blade as set forth in claim 1, wherein said blade has lugs for attaching it to the holder and additional apertures are formed between the apertures, said additional apertures being disposed under the holder and consisting of gaps left between adjacent lugs extending beneath said holder.

7. Windshield wiper blade as set forth in claim 1, wherein said apertures are inclined with respect to the longitudinal axis of the blade and have a truncated cross-sectional shape.

8. Windshield wiper blade as set forth in claim 1, wherein said apertures are inclined with respect to the longitudinal axis of the blade and have a parallelogram-like cross-sectional shape.

9. Windshield wiper blade as set forth in claim 1, wherein the flanges separating the apertures from one another extend obliquely with respect to the longitudinal axis of the blade.

References Cited in the file of this patent

UNITED STATES PATENTS

| 2,090,701 | Rodrick | Aug. 24, 1937 |
| 2,893,041 | Schafer | July 7, 1959 |

FOREIGN PATENTS

| 433,467 | Great Britain | Aug. 15, 1935 |
| 496,127 | Italy | July 5, 1954 |
| 496,876 | Italy | Aug. 11, 1954 |
| 1,033,521 | France | Apr. 1, 1953 |